US 8,016,149 B2

(12) United States Patent
Goulet

(10) Patent No.: US 8,016,149 B2
(45) Date of Patent: Sep. 13, 2011

(54) COMMUNICATIONS BOX

(75) Inventor: Burt Goulet, Bloomville, NY (US)

(73) Assignee: Sportsfield Specialties, Inc., Delhi, NY (US)

( * ) Notice: Subject to any disclaimer, the term of this patent is extended or adjusted under 35 U.S.C. 154(b) by 1305 days.

(21) Appl. No.: 11/389,345

(22) Filed: Mar. 24, 2006

(65) Prior Publication Data

US 2006/0216987 A1 Sep. 28, 2006

Related U.S. Application Data

(60) Provisional application No. 60/665,759, filed on Mar. 28, 2005.

(51) Int. Cl.
*B65D 25/06* (2006.01)
*H02G 3/14* (2006.01)
(52) U.S. Cl. ........................................ 220/532; 220/241
(58) Field of Classification Search .................. 220/797, 220/804, 806, 796, 801, 533, 532, 529, 553, 220/4.02, 3.92, 3.9, 3.7, 328, 327, 315, 212, 220/378, 629, 628, 652, 651, 643, 640, 526, 220/523, 500, 755, 770, 752, 4.01, 254.3, 220/254.1, 241, 242, 254.2, FOR. 203; 277/309, 277/311, 549; 292/307 B, 308, 307 R, 2; 439/535; 174/564, 562, 561, 560, 559, 520, 174/50.5; 361/679.01, 600; D9/439, 435; *B65D 25/06, 25/04; H02G 3/14*
See application file for complete search history.

(56) References Cited

U.S. PATENT DOCUMENTS

| 367,981 | A |   | 8/1887 | Hodge |
| 2,746,824 | A |   | 5/1956 | Bond |
| 2,950,837 | A | * | 8/1960 | Christensen et al. .......... 220/3.7 |
| 3,394,833 | A |   | 7/1968 | Forni et al. |
| 3,414,154 | A | * | 12/1968 | Rose et al. ..................... 220/3.7 |

(Continued)

FOREIGN PATENT DOCUMENTS

EP 393236 10/1990

OTHER PUBLICATIONS

Burt Goulet, pending U.S. Appl. No. 12/039,144, filed Feb. 28, 2008 entitled "Communications Boxes Having Flexible Seals".

(Continued)

*Primary Examiner* — Mickey Yu
*Assistant Examiner* — Robert J Hicks
(74) *Attorney, Agent, or Firm* — Heslin Rothenberg Farley & Mesiti P.C.

(57) ABSTRACT

A communications box for use beneath the surface of a track or artificial turf in an athletic field. The communications box has includes a base two major sides, and two minor sides. A partition is located between the major sides and generally parallel to the minor sides. The partition is secured to partition brackets. A cover bracket is located below the top edge of the major sides. Stud nuts are affixed to the outside of the major sides and minor sides. Stud bolts which engage the stud nuts retain the cover bracket and the partition bracket in place. Bolt holes for the stud bolts in the cover bracket are in pairs to permit the partition and the cover bracket to be raised and lowered for use with a turf cover under artificial turf and with a track cover under a track.

17 Claims, 4 Drawing Sheets

U.S. PATENT DOCUMENTS

| | | | |
|---|---|---|---|
| 4,095,719 | A | 6/1978 | Wolf |
| 4,313,609 | A | 2/1982 | Clements |
| 4,667,842 | A | 5/1987 | Collins |
| 5,316,167 | A | 5/1994 | Kay |
| 5,486,650 | A * | 1/1996 | Yetter .............................. 174/53 |
| 5,789,702 | A * | 8/1998 | Perella .......................... 174/481 |
| 6,395,981 | B1 * | 5/2002 | Ford et al. ........................ 174/50 |
| 6,407,928 | B1 | 6/2002 | Falkenberg et al. |
| 6,573,448 | B2 | 6/2003 | Mayer et al. |

OTHER PUBLICATIONS

"VersaCom Boxes," Gill Athletics, http://www.gillathletics.com/facilityCD/facilityCD_files/Page679.htm, 2-pages, Apr. 24, 2007.

F900—VersaCom Box—Turf Version, Gill Athletics, Champaign, IL, 5-pages, Nov. 4, 2004.

F910—VersaCom Box—Synthetic Version, Gill Athletics, Champaign, IL, 6-pages, Nov. 4, 2004.

F920—VersaCom Half Box—Turf Version, Gill Athletics, Champaign, IL, 4-pages, Nov. 4, 2004.

F930—VersaCom Half Box—Synthetic Version, Gill Athletics, Champaign, IL, 6-pages, Nov. 4, 2004.

"Communications/Electrical Box," Sports Edge, http://www.sportsedge.com/Communication_Boxes/, 9-pages, Nov. 4, 2004.

UCS Spirit, 712-1100 and 712-1200 Series Communication Boxes, 1-page, Mar. 2007.

Sports Field Electrical & Communication Junction Box Brochure. Sports Edge, 4 pages, 2000.

Electrical/Communication Junction Box, Sports Edge, Model Nos. ComBox 3000 and ComBox 3500, Cut sheets and Installation Notes, 10-pages, 2002.

* cited by examiner

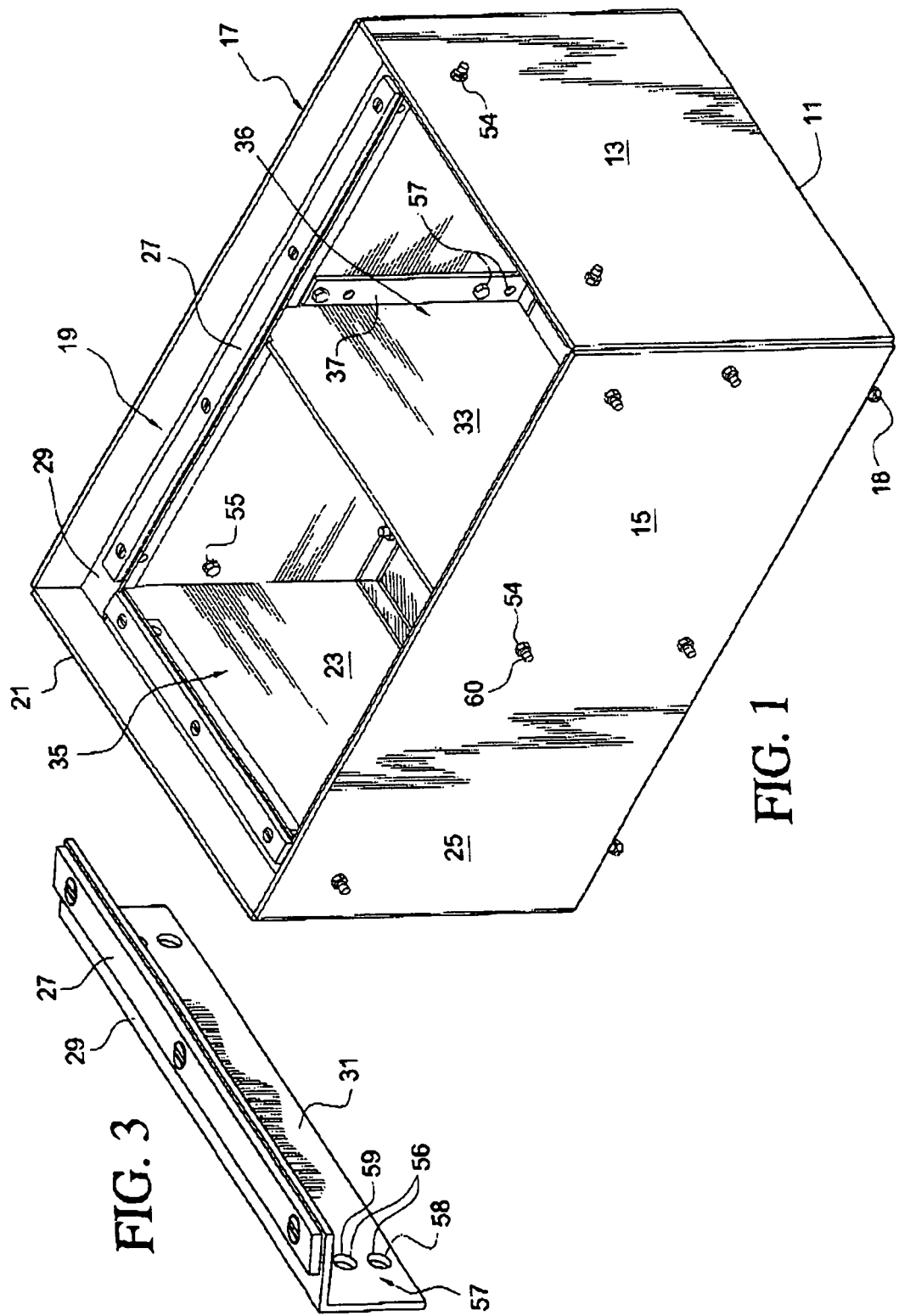

COMMUNICATIONS BOX

RELATED APPLICATIONS

This application claims priority based upon Provisional Patent Application Ser. No. 60/665,759 filed on Mar. 28, 2005 and entitled Communications Box.

BACKGROUND OF THE INVENTION

1. Field of the Invention

This invention relates to boxes for retaining communications equipment and, most specifically, relates to communication boxes placed underground in athletic fields for retaining communications equipment for use during sports and athletic events.

2. Prior Art

In the past, communication boxes have been used for sports and athletic events. Two types of communication boxes have been required, one for use under artificial turf and another for use beneath the surface of a track. Each of these two types of communication boxes were distinctive and each had its own cover. Unfortunately, the covers were not interchangeable. The existence of two such communications boxes created confusion during construction. A communications box intended for use under a track would be installed under artificial turf and vice versa. The result would be that the misplaced communications box would have to be dug up and the appropriate box would have to then be installed. This unfortunate procedure resulted in obvious economic loss and time delay. Since the cover of the appropriate box did not fit the inappropriate box that had been improperly installed, the mere exchange of covers was not possible. Therefore, it is apparent that a box that could be used for both situations and could accommodate either cover would avoid this economic loss and time delay. To achieve this result, a communications box would have to be developed that could be adapted to serve either purpose and to use either cover.

OBJECTS

The objects of this invention are to provide a communications box as follows:
1. That can be used both under turf and under a track.
2. That can be readily adapted to accommodate a cover for use under artificial turf and under a track.
3. That is economical to produce.
4. That is efficient and durable.

These and other objects of the present invention will become readily apparent upon further review of the following specifications and drawings.

SUMMARY OF THE INVENTION

A communications box is provided for use beneath the surface of an athletic field and having a base and two pairs of opposing sides, such pair of opposing sides being connected to the other pair of sides and being connected to the base. Both pairs of sides having a top edge and an interior surface and an exterior surface. A partition is located between one pair of sides and is generally parallel to one of the pair of sides. Means are provided for securing the partition to one pair of opposing sides in either one of two positions. The partition is located closer to the top edge in one of the two positions and is further removed from the top edge in the other position. A cover with an outside surface and an inside surface is placed with the inside surface facing the base and with the outside surface aligned with the top edge. The cover has at least one hand hole extending through the cover. Means are also provided to retain the cover in place at the top edge and means are also included to adjust the position of the means to retain the cover in a position in relation to the top edge.

BRIEF DESCRIPTION OF THE DRAWINGS

FIG. 1 is a perspective view of the communications box without a cover looking into the communications box from the front and one side of the communications box.

FIG. 3 is a perspective view of the cover bracket used to support the cover and showing a pair of bolt holes used to adjust the position of the bracket.

BRIEF DESCRIPTION OF THE NUMERALS

| NUMERAL | DESCRIPTION |
| --- | --- |
| 11 | Base |
| 13 | Minor Sides |
| 15 | Major Sides |
| 17 | Container |
| 18 | Adjustors |
| 19 | Interior Space |
| 21 | Top Edge |
| 23 | Interior Surface |
| 25 | Exterior Surface |
| 27 | Cover Bracket |
| 29 | Horizontal Part |
| 31 | Vertical Part |
| 33 | Partition |
| 35, 36 | Compartments |
| 37 | Partition Brackets |
| 38 | Cover |
| 39 | Turf Cover |
| 40 | Track cover |
| 41 | Lower Section |

-continued

| NUMERAL | DESCRIPTION |
| --- | --- |
| 42 | Upper Section |
| 43 | Screws or Bolts |
| 44 | Screw Plugs |
| 45 | Peripheral Openings |
| 46 | Upper Hand Holes |
| 47 | Lower Hand Holes |
| 48 | Turf Hand Holes |
| 49 | Turf Lids |
| 51 | Track Hand Hole |
| 53 | Track Lids |
| 54 | Stud Nuts |
| 55 | Wall Holes |
| 56 | Bolt Holes |
| 57 | Pairs of Bolt Holes |
| 58 | Lower Bolt hole |
| 59 | Upper Bolt Hole |
| 60 | Stud Bolt |
| 65 | Outside Surface |
| 67 | Inside Surface |
| 69 | Major Edges |
| 71 | Minor Edges |
| 73 | Rounded Loops |
| 75 | Longer Opposing Edges |
| 77 | Shorter Opposing Edges |
| 81 | Upper Lip |
| 83 | Lower Lip |
| 87 | Cover Notches |
| 88 | Lid Notches |
| 89 | Flexible Wire |
| 91 | Retainers |
| 93 | Retainer Shaft |
| 95 | Retainer Clip |
| 97 | Retainer Lever |

DETAILED DESCRIPTION OF THE PREFERRED EMBODIMENT

Figure 1A:
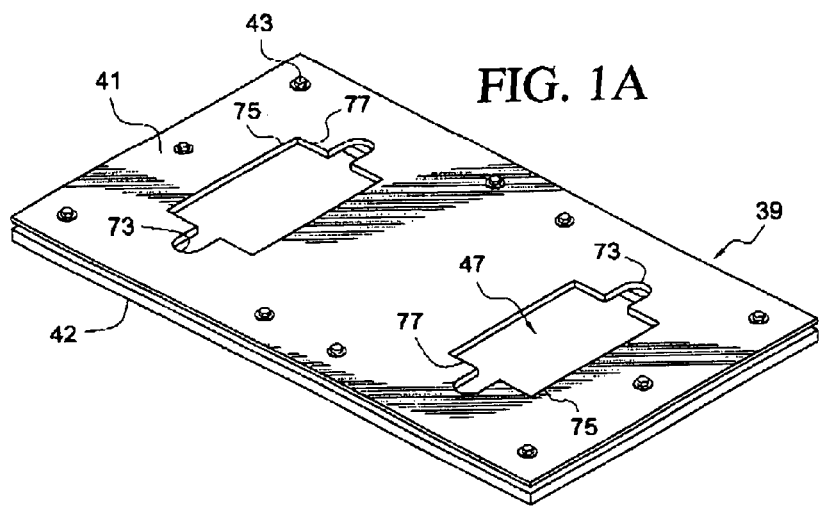
FIG. 1A is a perspective view of the lower section of the cover for the communications box that is used under artificial turf.
Figure 1B:
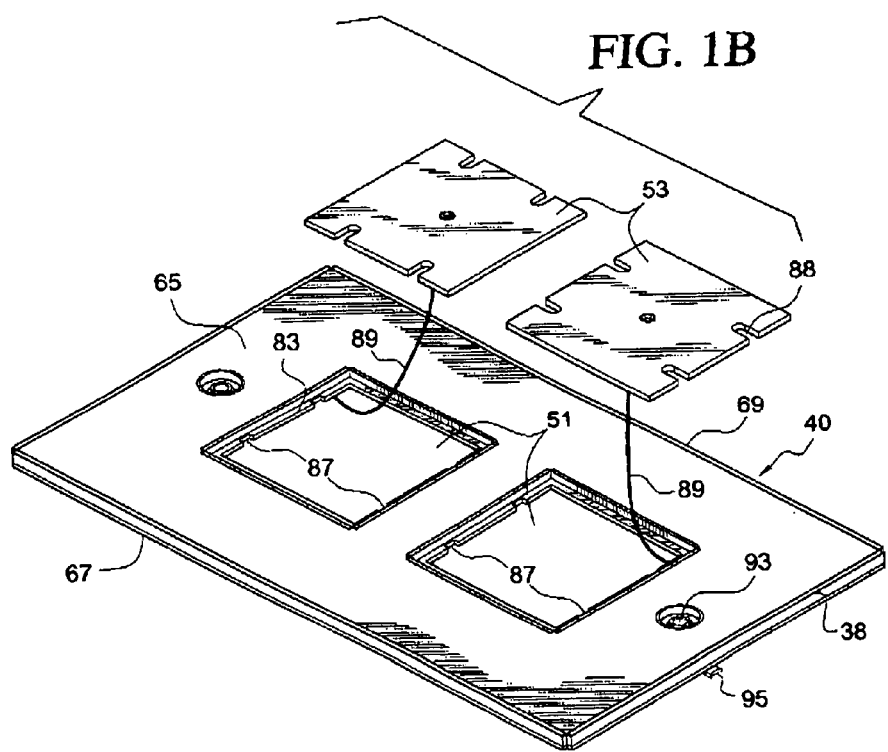
FIG. 1B is a perspective exploded view of the cover for the communications box that is used in a track with the lids removed from the cover, one lid being aligned with its respective hand hole to close the hand hole and the other lid being aligned to permit wires to be extended from the communications box through the cover.
Figure 2:
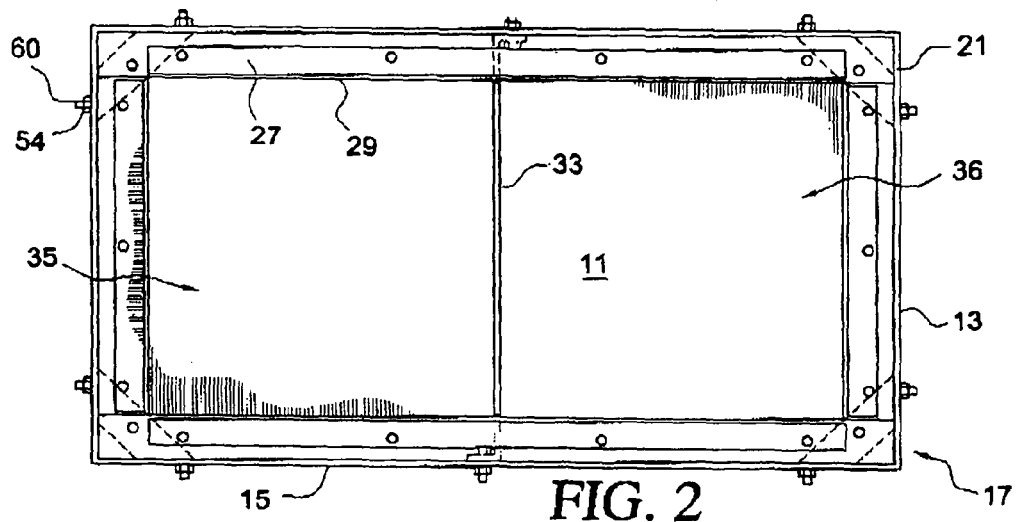
FIG. 2 is a plan view of the box looking down into the communications box with the cover removed showing the partition in the communications box and also showing the cover bracket for supporting the cover.

Referring now to FIG. 1, the communications box is shown in perspective. The communications box is rectangular and has a base 11, and two minor sides 13 and two major sides 15. The two major sides 15 are secured to the two minor sides 13 substantially at right angles and the major sides 15 and the minor sides 13 are secured to the base 11 substantially at right angles to the base 11. The two major sides 15 are substantially parallel to one another and the two minor sides 13 are substantially parallel to one another. The major sides 15 are larger than the minor sides 13. The base 11, the major sides 15 and the minor sides 13 form a container 17 which is the foundation of the communications box. Adjustors 18 are located in the base 11 and are used to level the communications box, The container 17 forms an interior space 19. The major sides 15 and the minor sides 13 include a top edge 21, an interior surface 23 within the container 17 and an exterior surface 25 on the outside of the container 17. Adjacent to the top edge 21 but slightly toward the base 11 and generally evenly spaced from the top edge 21, there is located a cover bracket 27 on the interior surface 23 of the container 17. The cover bracket 27 is preferably an angle member having a horizontal part 29 and a vertical part 31. The horizontal part 29 and the vertical part 31 preferably, but not necessarily, are the same size. The vertical part 31 is secured to the interior surface 23 of the major sides 15 and the minor sides 13. The cover bracket 27 is preferably continuously located beneath the top edge 21 on the interior surface 23 and within the interior space 19.

A partition 33 is located within the container 17 so as to form two compartments 35, 36 but mostly to provide added wall area on the partition 33 upon which communications equipment can be located. The partition 33 is preferably located from a major side 15 to a major side 15 and generally parallel to the minor sides 13 and is usually placed midway between the two minor sides 13. However, variations in the placement of the partition 33 within the container 17 are possible. Partition brackets 37, which are similar to the cover bracket 27, secure the partition 33 to the major sides 15. The partition brackets 37 are placed against the major sides 15 and are secured in a suitable manner to the partition 33. The partition brackets 37 and the cover bracket 27 both provide added rigidity to the container 17.

Figure 4A:
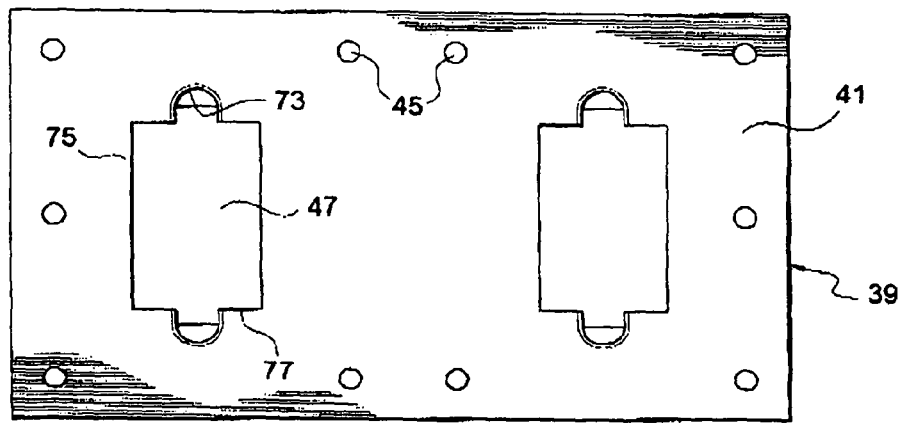
FIG. 4A is a plan view of the lower section of the cover when the cover is used under artificial turf.
Figure 4B:
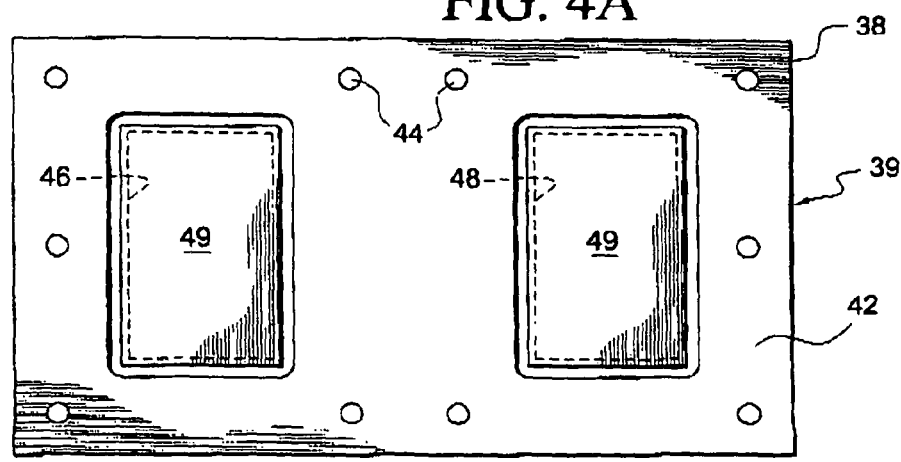
FIG. 4B is a plan view of the upper section of the cover for the communications box when used under artificial turf with turf lids in the hand holes in the cover, the turf lids being slightly smaller than the hand holes to permit wrapping of the of the turf lids in artificial turf.

The container 17 is used for two similar but distinctive communications boxes, namely a communications box for use under a track and a communications box for use under artificial turf. The primary difference between these two communication boxes is the cover 38 which is placed on the cover bracket 27 to close the container 17. There is a turf cover 39 for use under artificial turf and a track cover 40 for use beneath a track. The turf cover 39 has two sections, namely a lower section 41 (FIG. 4A) and an upper section 42 (FIG. 4B). The lower section 41 is preferably made of aluminum, as is the container 17. The upper section 42 is preferably made of plywood.

Artificial turf is wrapped around the upper section 42 and the lower section 41 is secured to the upper section 42 by screws or bolts 43 which extend through the lower section 41 and into the upper section 42. Peripheral openings 45 are located about the periphery of both the lower section 41 and the upper section 42. Plugs 44 are located in the peripheral openings 45 in the upper section. The peripheral openings 45 of the lower section 41 are aligned with the peripheral openings 45 of the upper section 42. In this manner, the lower section 41 is pressed against the artificial turf by the screw of bolt 43 and retains the artificial turf in place. The turf cover 39 is press fitted into the container 17 and against the cover bracket 27. The upper section 42 has upper hand holes 46 and the lower section 41 has lower hand holes 47. The upper hand holes 46 and the lower hand holes 47 together form the turf hand holes 48 which are closed by the turf lids 49 when placed into the upper hand holes 46.

Turf lids 40 are placed in the upper hand holes 46 in the upper section 42. As seen in FIG. 4B, the turf lids 49 are smaller than the upper hand holes 46 to allow for artificial turf to be wrapped around the turf lids 49. The turf lids 49 are wrapped in artificial turf and are force fitted into the upper hand holes 46. Since the lower hand holes 47 in the lower section 41 are smaller than the upper hand holes 46 in the upper sections 42, the turf lids 48 cannot drop below the upper hand holes 46. The track cover 40 has track port holes 51 for which lids 53 are provided.

The turf cover 39 is somewhat thicker than the track cover 40. To accommodate both the turf cover 39 and the track cover 40, it is necessary that the vertical part 31 of the cover bracket 27 and the partition brackets 37 be adjustable to permit changes in the location of the cover bracket 27 and the partition brackets 37 in relation to the top edge 21.

There are various ways that the cover bracket 27 and the partition brackets 37 are secured. A preferable way is to secure stud nuts 54 to the exterior surface 25 of the container 17 which communicate with wall holes 55 in the minor sides 13 and the major sides 15. Bolt holes 56 are located in the cover bracket 27 on the vertical part 31 and on the partition brackets 37. The bolt holes 56 are provided in pairs 57, the bolt holes 56 of each pair 57 of bolt holes 56 being vertically separated by a short distance. The cover bracket 27 and the partition brackets 37 must be lower to accommodate the turf cover 39 and higher to accommodate to track cover 40. Therefore, when the track cover 40 is to be used, the lower one of the bolt holes 56 of each pair 57 of bolt holes 56 are used. When the turf cover 39 is to be used, the upper bolt hole 59 of the pair 57 of bolt holes 56 is used. A stud bolt 60 is used to engage the stud nut 54 and the upper bolt hole 59 of the bolt holes 56.

The turf cover 39 and the track cover 40 are both rectangular. The turf cover 39 preferably has two turf hand holes 48, including the upper hand holes 46 and the lower hand holes 47, located through the turf cover 39.

The track cover 40 preferably has two track hand holes 51 located through the track cover 40. Each track hand hole 51 has a track lid 53 placed in it. Both the turf cover 39 and the track cover 40 have an outside surface 65 and an inside surface 67. As seen in FIG. 4A and in FIG. 4B, the turf hand holes 48 and the track hand holes 51 are generally evenly spaced and symmetrically located respectively in the turf cover 39 and the track cover 40 and which extend through the turf cover 39 and the track cover 40 from the outside surface 65 to the inside surface 67. The turf cover 39 and the track cover 40 each have a pair of major edges 69 and a pair of minor edges 71 to fit respectively along the major sides 15 and the minor sides 13 of the container 17. The major edges 69 are longer than the minor edges 71.

The turf hand holes 48 of the turf cover 39 are generally rectangular with rounded loops 73 at two opposing edges of the lower hand holes 47 of the lower section 41 of the turf cover 39. The major axis of the turf hand holes 48 passes through the center of the rounded loops 73 as the rounded loops 73 are located generally midway between the two longer opposing edges 75 of the turf hand hole 48 and on the outer side of the two shorter opposing edges 77 thereof. The longer opposing edges 75 of the lower section 41 of each turf hand hole 48 are generally parallel with the minor edges 71 of the turf cover 39. As previously discussed, turf lids 49, wrapped in artificial turf, are used to close the upper hand holes 46 thereby closing the turf hand holes 48.

Figure 5:
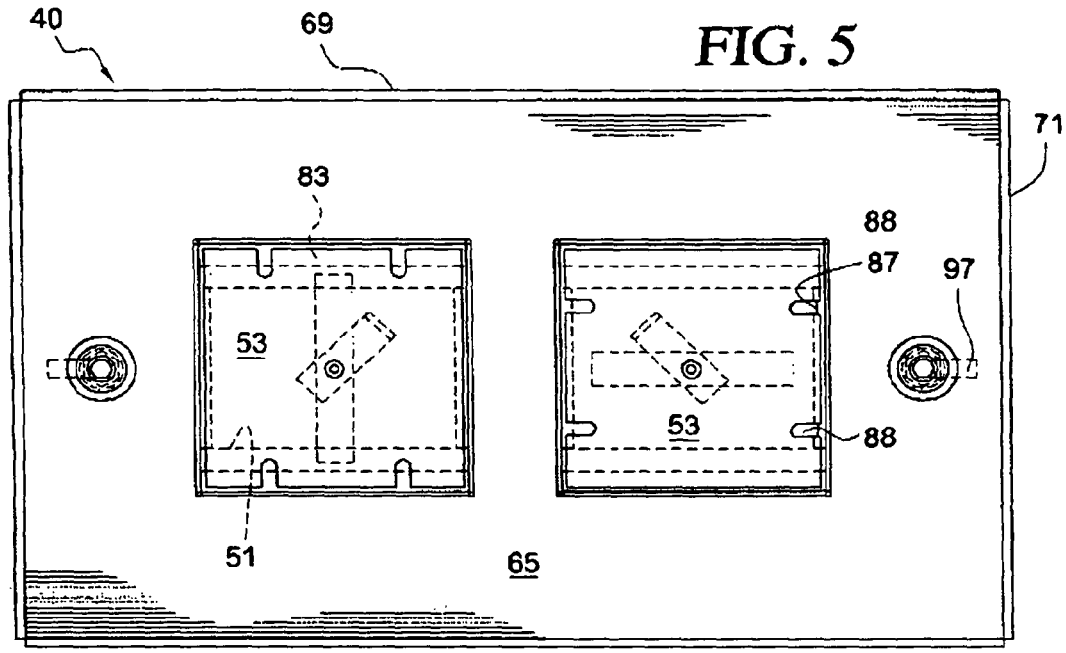
FIG. 5 is a plan view of the cover for use in a track with lids in the hand holes, one lid being in the closed position and the other lid being in the open position.
Figure 6:
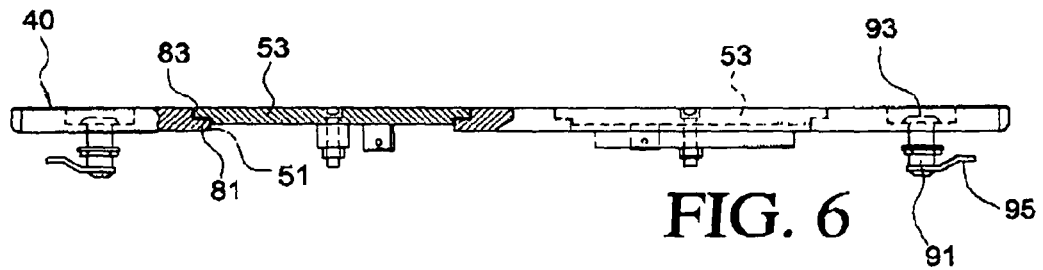
FIG. 6 is a side elevation of the cover shown in FIG. 5 showing the clips used to hold the track cover on the communications box.
Figure 7:
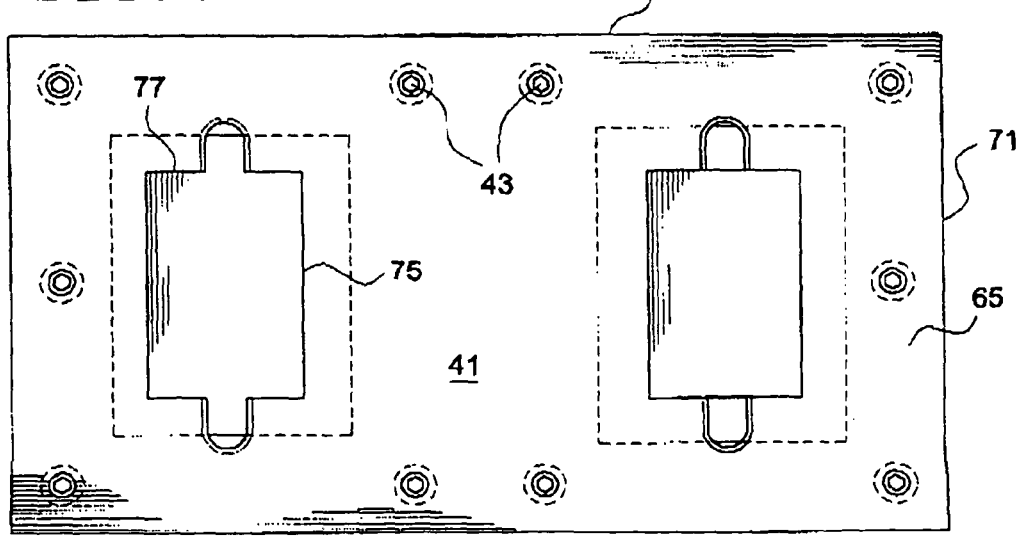
FIG. 7 is a plan view of the lower section of the cover used under artificial turf with the outline of the hand holes of the upper section shown in broken lines.

The track hand holes 51 are square. The track lids 53 which are used to close the track hand holes 51 have an upper lip 81 at the outside surface 65 and around the entire periphery of each track lid 53. Each track hand hole 51 has a lower lip 83 blow the outside surface 65 and at the inside surface 67 around the entire periphery of each track hand hole 51. The upper lip 81 of each track lid 53 rests upon and mates with the lip 83 of the track hand hole 51. Two opposite lower lips 83 of each of the two track hand holes 51 has a pair of cover notch 87 in it. The pair of cover notches 87 are symmetrically spaced on the lips 83 of the track hand holes 51 which are opposite from one another and are generally parallel to one another. Two opposite upper lips 81 of the track lids 53 used in the track hand holes 51 have lid notches 88 which mate with the notches 87 of the lips 81 which are notched when placed over the lips 81 that have notches 87. When the lid notches 88 of the track lids 53 are rotated ninety degrees, the lid notches 88 of the track lids 53 are located over cover lips 81 which are not notched, thereby closing the track cover 40. Thus, when the lower notches 87 and the lid notches 88 are aligned, wires for communication purposes can be extended from the communications box through the cover notches 87 and the lid notches 88 and out of the track cover 40. When a track lid 53 is placed on the track cover 40 without the cover notches 87 and the lid notches 88 being aligned, the track cover 40, with both lids 53 so oriented, is closed. To prevent a track lid 53 from being misplaced, the track lid 53 is secured to its respective track cover 40 by a flexible wire 89 which does not prevent removal and rotation of the track lid 53 but does prevent the track lid 53 from being misplaced. Retainers 91 (FIGS. 5 and 6) including a retainer shaft 93 and a retainer clip 95 are used to secure the track cover 40. When the retainer shaft 93 is turned by a retainer lever 97, the retainer clip 95 is placed under the cover bracket 27 thereby holding the track cover 40 in place.

It is to be understood that the drawings and description matter are in all cases to be interpreted as merely illustrative of the principles of the invention, rather than as limiting the same in any way, since it is contemplated that various elements to achieve like results without departing from the spirit of the invention or the scope of the appended claims.

The invention claimed is:

1. A communications box for use beneath the surface of an athletic field comprising:
   a base;
   two pairs of opposing sides, both pairs of sides being connected to the other pair of sides and being connected to the base and pairs of sides having a top edge and an interior surface and an exterior surface;
   a partition located between one pair of sides and being generally parallel to the other pair of sides;
   means for securing the partition to the one pair of opposing sides;
   a cover having an outside surface and an inside surface, the inside surface having at least one hand hole extending through the cover, and the cover having an outer peripherally-extending edge extending between the outside surface and the inside surface of the cover;
   means to retain the cover in place adjacent to the top edge, the inside surface of the cover disposed below the top edge and resting upon the means to retain the cover in place so that the outer peripherally-extending edge is disposed between the interior surfaces of the two pairs of the opposing sides and the inside surface of the cover is disposed below the top edge of the two pairs of the opposing sides; and
   means to adjust the position of the means to retain the cover in place so that the inside surface of the cover is positionable at different elevations below the top edge of the two pairs of opposing sides.

2. A communications box according to claim 1 wherein the means for securing the partition to one pair of opposing sides includes a pair of partition brackets.

3. A communications box according to claim 1 wherein the means for securing the partition comprises means for securing the partition to the one pair of opposing sides in either one of two positions, the partition being closer to the top edge in one of the two positions, and wherein:
   the means for securing the partition to one pair of opposing sides includes partition brackets, each partition bracket having two pairs of bolt holes;
   partition stud nuts secured to the interior surface of two opposing sides, the opposing sides having wall holes communicating with the stud nuts; and
   partition stud bolts located in an opening of a pair of openings in the partition bracket, each partition stud bolt engaging a partition stud nut.

4. A communications box according to claim 1 wherein the means to retain the cover in place includes a cover bracket being a right angle member having a vertical part and a horizontal part and being located on the interior surface a short distance from the top edge.

5. A communications box according to claim 1 wherein the means to retain the cover in place includes a cover bracket being a right angle member having a vertical part and a horizontal part and being located on the interior surface a short distance from the top edge, the vertical part having pairs of openings vertically aligned with one another and in a spaced relationship to one another.

6. A communications box according to claim 1 wherein the means to retain the cover in place includes:
- a cover bracket being a right angle member having a vertical part and a horizontal part and being located on the interior surface a short distance from the top edge, the vertical part having pairs of openings vertically aligned with one another and in a spaced relationship to one another;
- cover stud nuts mounted on the exterior surface, the two pairs of opposing sides having wall holes communicating with the stud nuts; and
- cover stud bolts located in one opening of the pairs of openings in the vertical part.

7. A communications box according to claim 1 wherein:
- the base being rectangular;
- the two pairs of opposing sides comprising a pair of major sides and a pair of minor sides, the major sides generally being the same size and being substantially parallel to one another, the minor sides being smaller than the major sides and generally being the same size and being generally parallel to one another, the major sides being connected to the minor sides generally at right angles to one another, and both the major sides and the minor sides having the top edge and the interior surface and the exterior surface;
- the partition being located between the major sides and being generally parallel to the minor sides;
- the means to retain the cover in place at the top edge comprising a cover bracket; and
- the means to adjust operable to adjust the position of the means to retain the cover in relation to the top edge;
- the cover having the inside surface resting upon the cover bracket, the at least one hand hole comprising a pair of hand holes extending though the cover, and the hand holes being rectangular.

8. A communications box according to claim 7 wherein the cover is a turf cover having a lower section and an upper section and wherein the hand holes have major edges and minor edges, the major edges being larger than the minor edges, the minor edges having rounded loop openings extending from the minor edges and being generally located midway between the two major edges and the upper section has hand holes that are rectangular and are larger than the hand holes of the lower section.

9. A communications box according to claim 7 wherein:
- the hand holes are square, each hand hole having a lower lip at the inside surface of the cover, the lower lip on each of two opposing sides having cover notches through the lower lip;
- a track lid which is removable and that fits into the hand hole and having upper lips at the outside surface, the track lid having lid notches which align with the cover notches when in an open position and which close when the lid notches are turned ninety degrees; and
- a thin flexible wire extending from the track lid to the cover, the thin flexible wire being sufficient in length to permit the track lid to be removed from the hand hole.

10. A communications box according to claim 7 wherein: the means for securing the partition comprises:
- a pair of partition brackets secured to the partition, the partition brackets being secured to the major side, each partition bracket having two pairs of bolt holes;
- partition stud nuts secured to the exterior surface of both major side, wall holes in the sides communicating with the partition stud nuts; and
- partition stud bolts, one partition stud bolt being located in one bolt hole of each pair of bolt holes in the partition bracket;

the means to retain the cover comprising:
- the cover bracket being a right angle member having a vertical part and a horizontal part and being located a short distance on the interior surface from the top edge, the cover bracket being mounted on both the major sides and the minor sides, each vertical part having a pair of openings vertically aligned with one another and in a spaced relationship to one another;
- cover stud nuts mounted on the exterior surface, the major sides and the minor sides having wall holes communicating with the stud nuts; and
- cover stud bolts located in one opening of the pairs of bolt holes in the vertical part and engaging a stud nut.

11. A communications box according to claim 10 wherein the cover is a turf cover having a lower section and an upper section.

12. A communications box according to claim 10 wherein the cover is a turf cover having a lower section and an upper section and wherein the hand holes have major edges and minor edges, the major edges being larger than the minor edges, the minor edges having rounded loop openings extending from the minor edges and being generally located midway between the two major edges and the upper section has hand holes that are rectangular and are larger than the hand holes of the lower section.

13. A communications box according to claim 10 wherein:
- the hand holes are square, each hand hole having a lower lip at the inside surface, the lower lip on each of two opposing sides having cover notches through the lower lip;
- a track lid which is removable and that fits into the hand hole with upper lips on two opposing edges of the track lid with lid notches which align with the notches in the lower lid when in an open position when the lid notches in the lid are placed over the cover notches and which close the cover notches in the lower lip when turned ninety degrees from the open position; and
- a flexible wire extending from the track lid to the track cover, the flexible wire being sufficient in length to permit the track lid to be removed from the hand hole.

14. A communications box according to claim 7 wherein the major sides and the minor sides being connected to the base substantially at right angles.

15. A communications box according to claim 1 wherein the means for securing the partition comprises means for fixedly securing the partition to the one pair of opposing sides in either one of two positions, the partition being closer to the top edge in one of the two positions.

16. A communications box according to claim 6 wherein the means for securing the partition comprises means for fixedly securing the partition to the one pair of opposing sides in either one of two positions, the partition being closer to the top edge in one of the two positions.

17. A communications box according to claim 7 wherein the means for securing the partition comprises means for fixedly securing the partition to the one pair of opposing sides in either one of two positions, the partition being closer to the top edge in one of the two positions.

\* \* \* \* \*